United States Patent Office 3,127,014
Patented Mar. 31, 1964

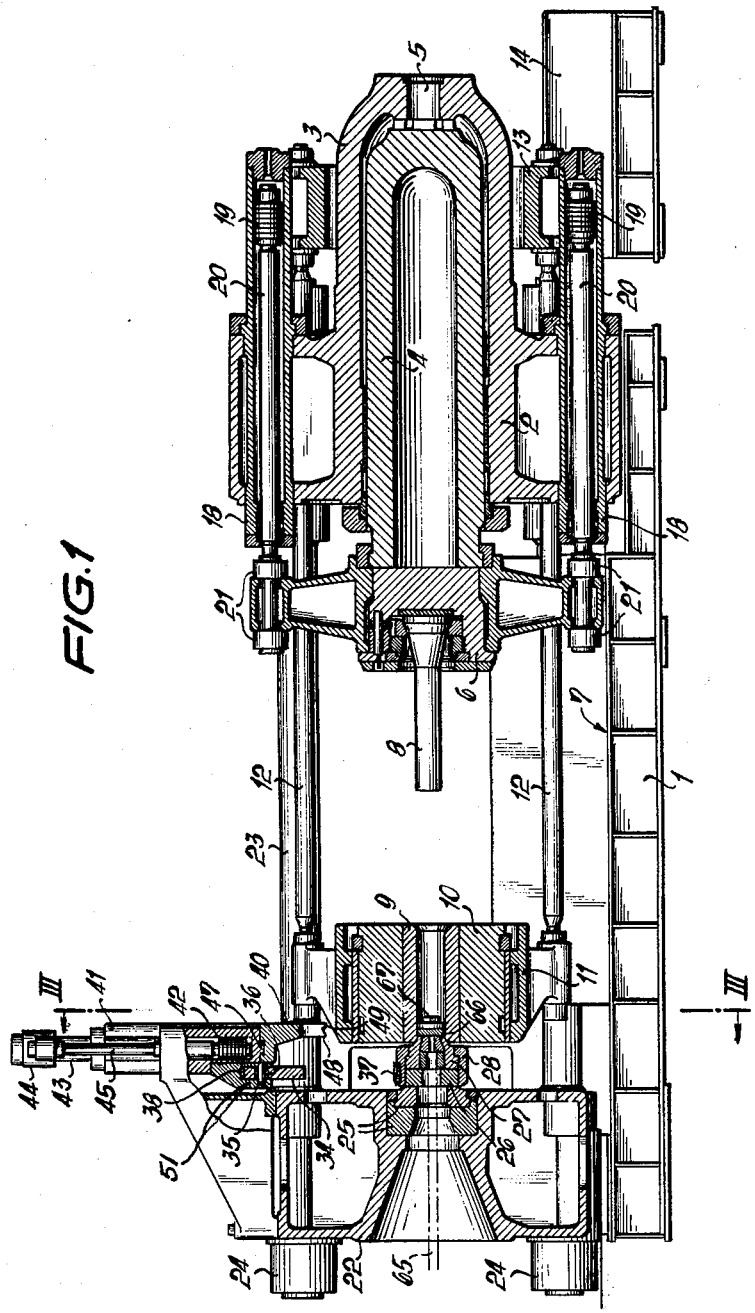

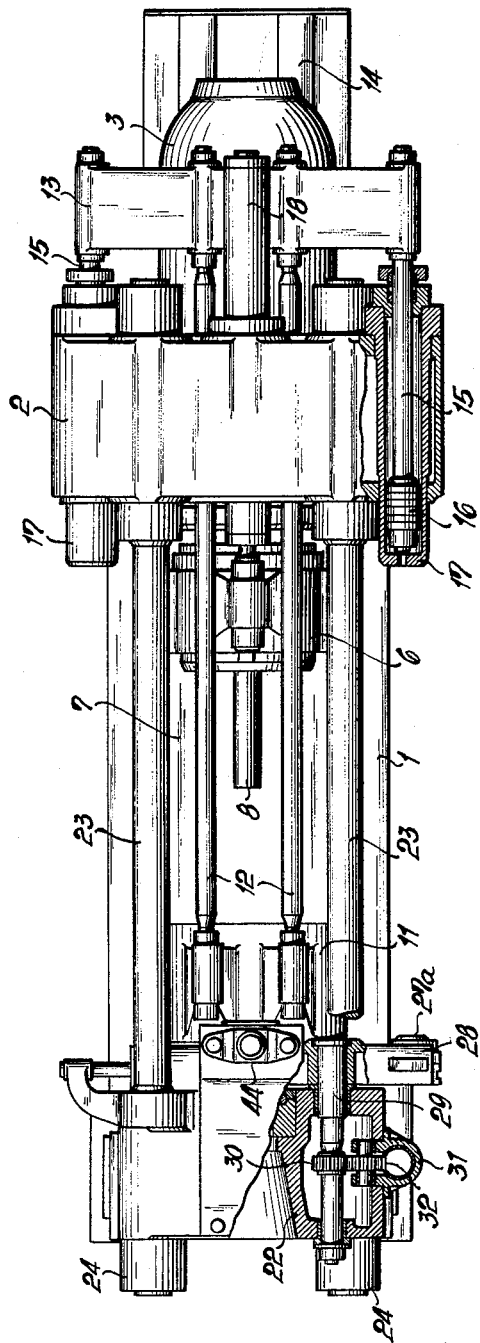

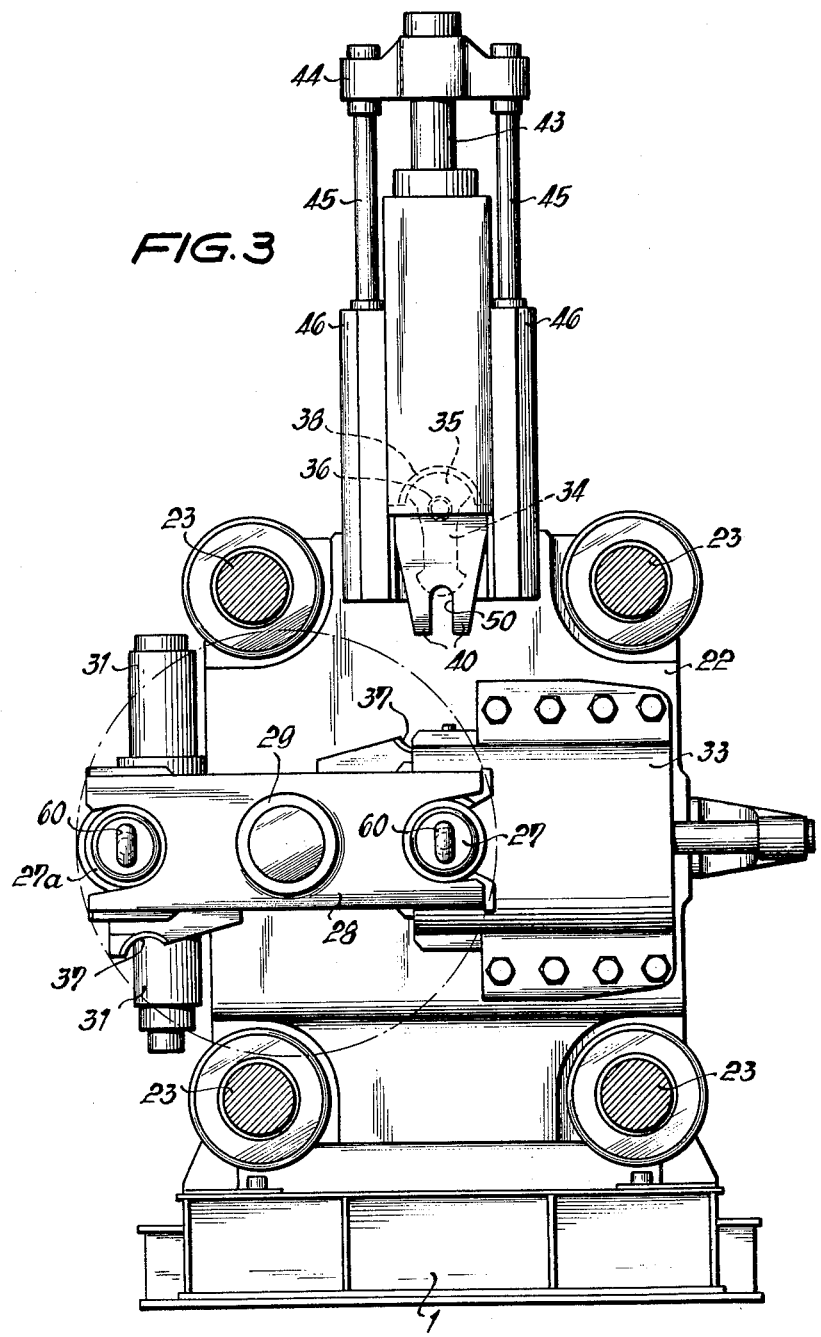

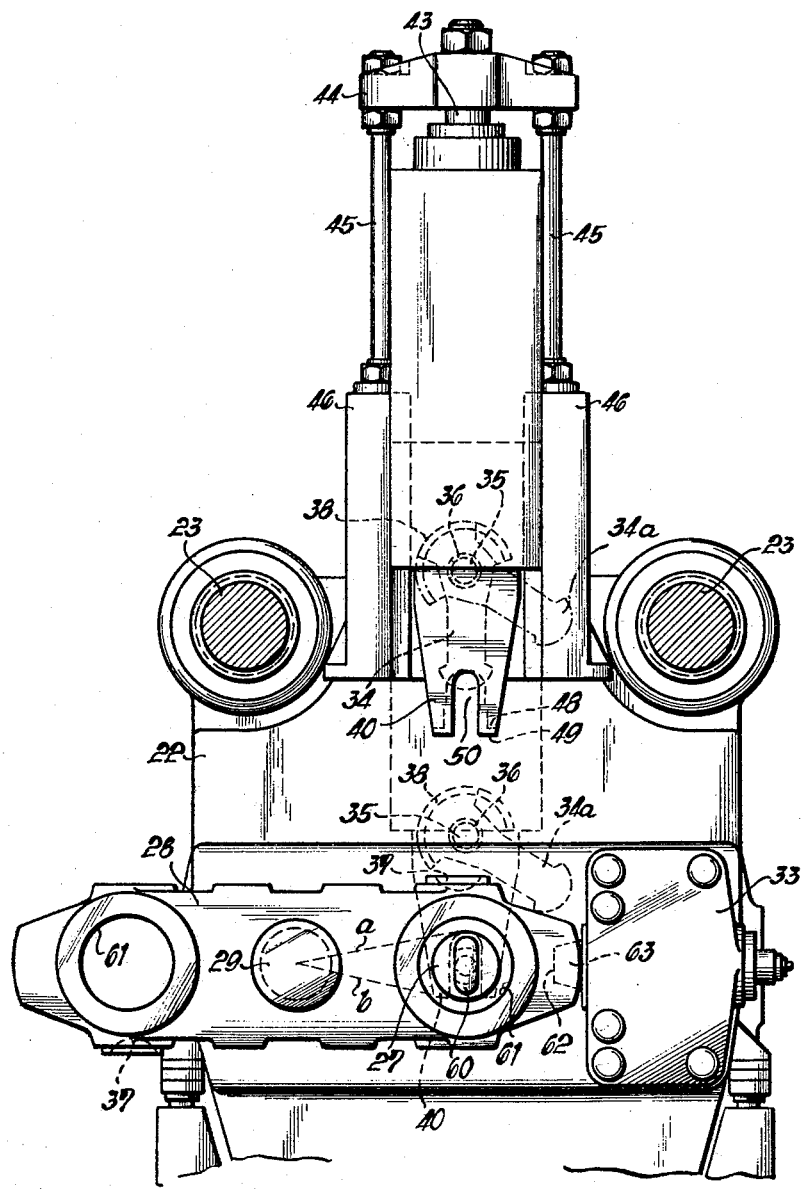

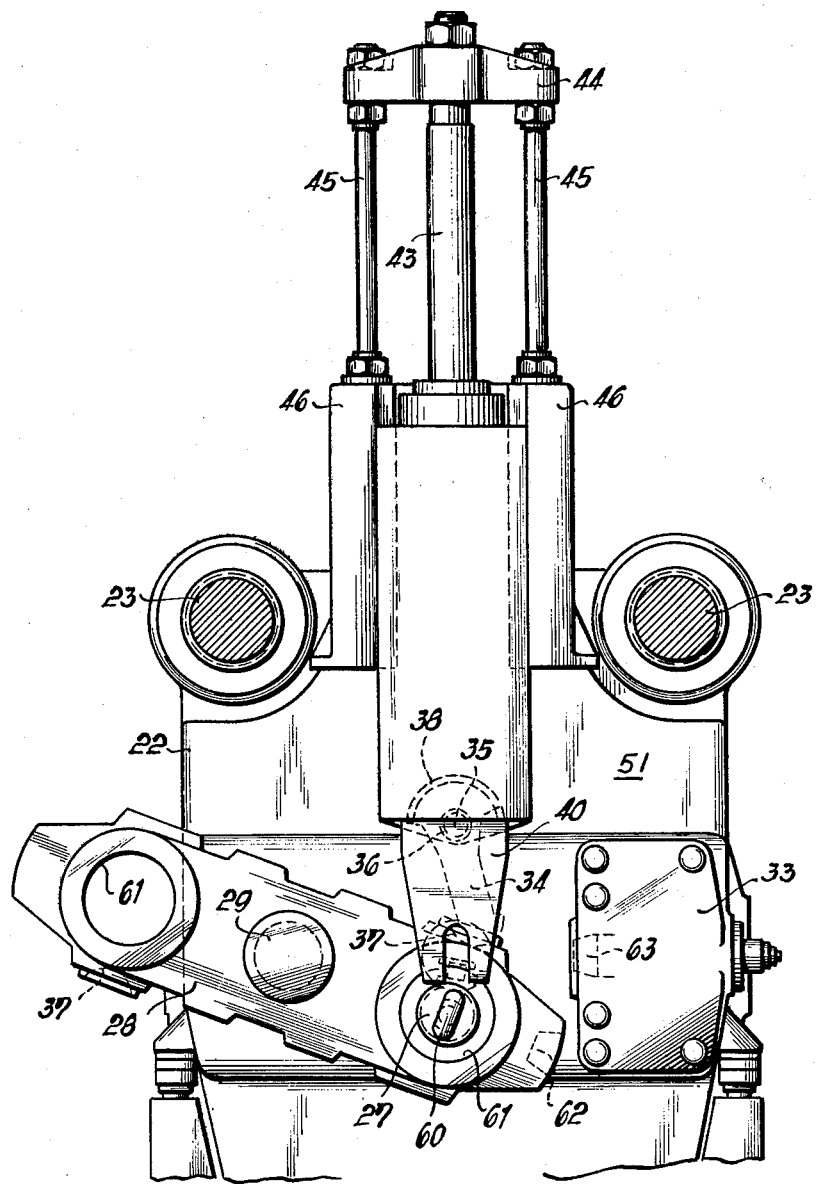

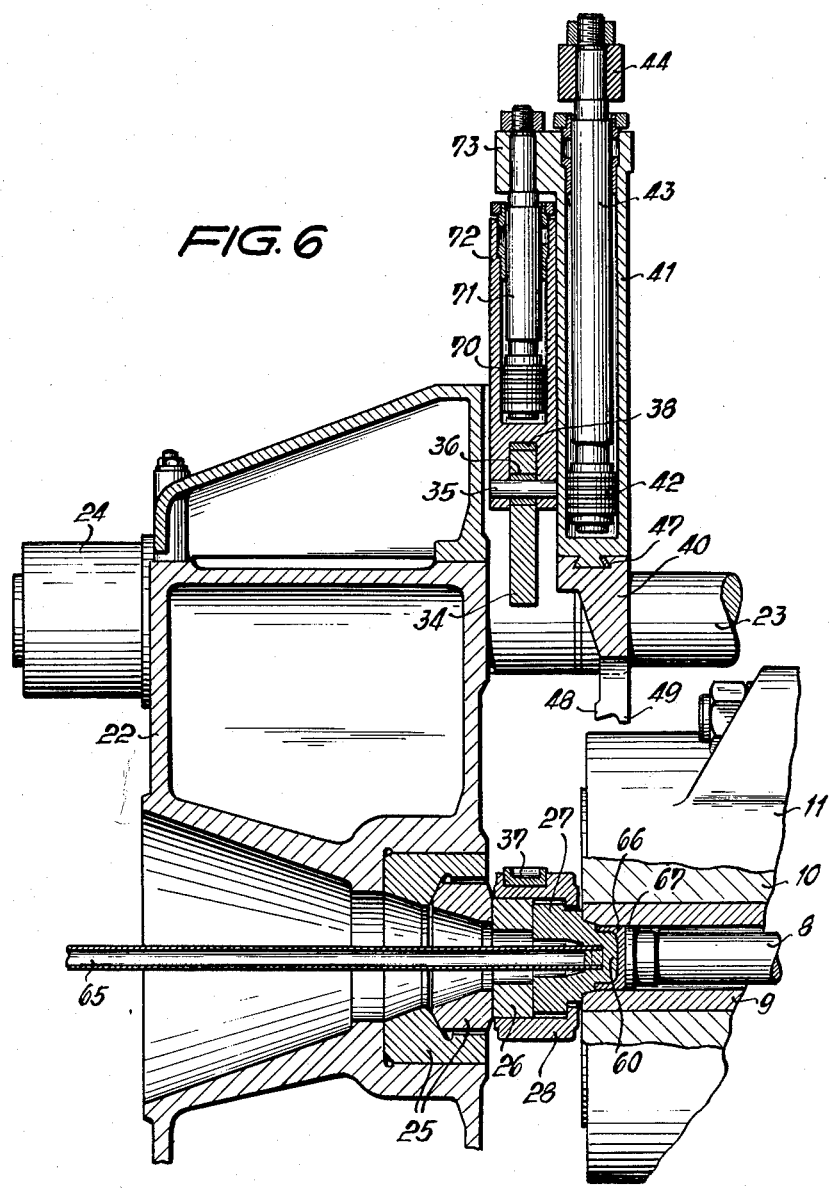

3,127,014
HORIZONTAL METAL-TUBE AND EXTRUSION PRESSES
Walter Dohrn and Walter Jarausch, Dusseldorf, Germany, assignors to Schloemann Aktiengesellschaft, Dusseldorf, Germany
Filed Jan. 10, 1961, Ser. No. 81,837
Claims priority, application Germany Jan. 14, 1960
5 Claims. (Cl. 207—1)

This invention relates to a horizontal metal-tube and extrusion press with a retractable container, and with a holding arm which is rotatable about an axis parallel to the extrusion axis of the press, and which carries dies which are rockable into the extrusion position. If in such a press the severing of the extruded product from the discard or extrusion residue is on definite grounds to be effected in front of the die, as seen in the direction of extrusion, shears that can be introduced from above are usually employed. The container has to be retracted to an extent equal to the breadth of the in-coming shear blade that severs the discard.

Now the manner in which the extruded product can be freed from the die depends upon the nature of the die. There are several kinds of dies, amongst others the so-called blade die, which presents no running-in radius, and is employed for the extrusion of aluminium; the running-in die, which opens with a large radius towards the container, and serves for the extrusion of heavy metals; and the bridge die or chamber die, the adoption of which presupposes weldable light-metal alloys.

When the shears have cut off the extrusion residue in front of the die, it is possible, in the case of a blade die, for the extruded product to be pulled through the die from the bolster side; the running-in die, however, renders necessary a special ejector, which releases the intake with cutting edges; and the bridge die preferably has auxiliary shears lodged in the bolster, which sever the extruded product, the discard that then remains sticking in the die being forcibly torn out of the die. Injuries to the die cannot always in this case be avoided.

The object of this invention is to render the auxiliary devices, such as ejectors and auxiliary shears, unnecessary, and also, when the blade die is employed, to provide certain improvements. A press is indeed already known which has a die slide which can travel transversely to the extrusion axis, and which is provided with cutting edges, and therefore also renders auxiliary shears and an ejector superfluous. The driving of the slide, however, has to be so stoutly constructed that it can fulfil these functions also. This leads to a massive construction of the slide. In connection with a press having a rotatable die-holder arm, its share in fulfilling the shearing function would involve a powerful drive, and a correspondingly massive design of the holder arm and its bearings. The aim of this invention is to obviate these disadvantages, to avoid loading the die-holder arm with special functions, and not to design it more massively than its own duty requires.

It is therefore proposed, according to the invention, to equip a press of the construction hereinbefore described with a press rod or stilt, which can be brought in transversely to the extrusion axis, and can be brought into engagement with an abutment provided on the holder arm, for instance a pan-like recess, and which rotates the holder arm through an angle of at least such magnitude that the sides of the angle are able to accommodate the profile of the die between them. The rod or stilt is preferably applied to the holder arm vertically above the die.

According to a further feature of the invention, the press rod is coupled to hydraulically driven shears known in themselves, and remains stationary during the cutting, which is effected in front of the die, as seen in the direction of extrusion, in a position rocked out from the holder arm.

Moreover the longitudinal dimensions of the shears and of the press rod, in the position rocked into the holder, are so adjusted to one another that the shears do not come to the cutting point before the engagement of the press rod.

Further features of the invention are explained in the description of the accompanying drawings, in which:
FIGURE 1 shows a horizontal extrusion press according to the invention in axial sectional elevation, with a blade die inserted;
FIGURE 2 shows the associated plan;
FIGURE 3 shows a section on the line III—III in FIGURE 1, on a larger scale;
FIGURE 4 shows a section, similar to that of FIGURE 3, of a somewhat differing constructional example;
FIGURE 5 shows the same section as FIGURE 4, but in a different operative position; and
FIGURE 6 shows an axial longitudinal section through those parts of a third constructional example which are essential to the invention, wherein the press rod and the shears each have a separate drive, and a bridge die is inserted for the extrusion of tubes.

The same references denote the same parts in all the figures.

In the constructional example of FIGURES 1 to 3, there rests upon a foundation structure 1 a cylinder cross-beam 2, which is integral with the working cylinder 3. In the working cylinder 3 a piston 4 moves forward (to the left) when pressure liquid is introduced into the cylinder 3 through an aperture 5. The piston 4 is connected with a platen 6, which slides on guideways 7 on the foundation structure 1. The platen carries a press ram 8, which, during the advance of the piston 4, is introduced into the bush 9 of a container 10. The container 10 is mounted in a container-holder 11, which is axially displaceable upon horizontal guideways, not shown. For this purpose there are secured to the container-holder four guiding rods 12, which are guided through corresponding bores in the cylinder cross-beam 2, and are secured to a ring-traverse 13, which can slide upon a guideway 14. The ring-traverse itself is rigidly connected with two laterally arranged piston rods 15, the pistons 16 of which slide in container-displacing cylinders 17, when they are acted upon by pressure liquid upon one side or the other. For the retracting of the platen 6, when it has advanced towards the left, there serve two retracting cylinders 18, one of which is arranged above and the other below, and in which run pistons 19, which are attached to the platen 6 by way of piston rods 20 and nuts 21.

At the left-hand end of the foundation structure 1 is erected the bolster 22 of the press, which is connected with the extrusion cylinder 3 by four tie columns 23, which are secured to it by means of nuts 24. The bolster 22 carries in the usual manner two-part pressure bodies 25, against which bears a pressure plate 26, with a die 27. The pressure plate 26 and the die 27 are together mounted in a double-ended holder arm 28, which is rotatable on a spindle 29. On the other end, the left-hand end in FIGURE 3, of the holder arm 28, is mounted a further die 27a. These two parts, in the position shown in FIGURE 3, can easily be dismantled. The spindle 29, upon which the holder arm 28 is mounted fast, carries a pinion 30, which can be rotated in one direction or the other by the upward or downward movement of a toothed rack 32. For the upward and downward motion of the rack there serve two pistons rigidly connected with it, which can be moved up and down alternately, in a vertical cylinder 31, by hydraulic means. By blocking the pistons, not shown, in the cylinder 31, the holder arm 28 can be held fast. For the fixing of the holder arm 28 there may alternatively serve a locking means 33, which is more specifically described in connection with FIGURES 4 and 5.

The holder arm 28 is provided with an abutment, namely a pan-like recess, which is constructed as an inserted bearing brass 37. This bearing brass can be brought into engagement with a press rod or stilt 34, which is rockably supported about a pivot 35. Here the bearing means is so constructed that a bearing 36 renders the rockability possible only while the pressure forces of the press rod are taken up by a thrust bearing 38. The rocking of the press rod may be effected either by hand or else with the aid of ordinary positioning appliances.

A shear blade 40 is equipped with a hydraulic drive, comprising a cylinder 41 and a piston 42. The piston rod 43 is secured to a yoke 44, to both ends of which are attached columns 45, which carry the piston rod 43 by way of brackets 46. The shearing blade 40 is connected with the shearing cylinder by way of a dovetail guide 47. It has a shearing edge 48 and a pressure edge 49. For the overlapping of a bridge die, as illustrated in FIGURE 6, the shearing edge 48 and the pressure edge 49 are provided with recesses 50. The bearing 36 of the press-rod spindle 35 is part of an element 51, which is rigidly connected with the shearing cylinder 41.

Of the second constructional example, only the parts that are essential to the invention are illustrated in FIGURES 4 and 5, in different operative positions. The same references have the same meaning as in FIGURES 1 to 3. Supplementing these figures it is to be observed that the die 27, with bridge 60, is mounted in a bore 61, closed all round, in the holder arm, and that the latter has a notch 62, for the entry of a bolt 63, which can be actuated by the locking means 33. In FIGURE 4 an angle is bounded by the lines *a* and *b*, the vertex of the angle being located in the axis of the pivot 29, and the angle enclosed by the two sides *a* and *b* being at least large enough to accommodate the profile of the die 27.

After the extrusion, which gives rise to a product 65 with a discard 66, the container 10 is drawn back, so that besides the die 27 and the discard 66 adhering to it, the press disc 67 also is exposed. The forked shear blade 40 comes in, from above, settles with its pressure edges 49 upon the press disc 67 and pushes this down, and at the same time, on both sides and in front of the die bridge 60 and the die 27, with its shearing edge 48, shears the discard 66 from the extruded product 65. The press rod 34 remains stationary, during this shearing operation, in the outwardly rocked position 34*a* shown in FIGURE 4. After the discard, has been sheared off, the shear blade 40 re-ascends, and the press rod 34 rocks into its position, shown in FIGURES 3 and 4, parallel to the shears. Upon the renewed descent of the shearing cylinder 41, the press rod 34 now engages in the bearing brass 37 of the holder arm 28. The adjacent surfaces of the pressure plate 26, located behind the die 27, and of the tool pressure plate 25, located in the bolster 22, are made sharp-edged. Under the pressure of the drive 41/42, transmitted by the press rod 34 in engagement with the bearing brass 37, the holder arm 28 is now rotated, at least until the line *a* comes into the position of the line *b* (FIGURE 4), and the shearing edges of the two plates 25 and 26 sever the extruded product 65, sticking in the holder arm 28, so that this product is set free, and the holder arm 28 can swing out. This procedure takes place with the bolt 63 disengaged from the notch 62 of the locking means 33 unlocked, as shown in FIGURE 5. In this way the drive, which is in any case necessary for the shearing in front of the die, is utilised for severing the extruded product at the bolster, without the rotary drive 30, 31, 32 having to provide an additional torque for the shearing.

When a running-in die is employed, the shearing operation will proceed in the same manner as has been described above. When a blade die is employed, in which case the container and the die bear against one another with plane parallel end faces, it is also possible to make the surface thereof facing the container 10 sharp-edged, so that the cutting with the shears can be omitted, because then a cutting with the edges of the container and of the die is possible. The longitudinal dimensions of the appliances are so adjusted to one another that the shear blade 40 does not come to the cutting point before the engagement of the press rod 34 in the bearing brass 37 of the holder arm 28. In this case, for the press rod 34, the rocked-out position 34*a* is omitted; it stands from the outset in a position parallel to the shear blade 40, and shears the discard 66 from the extruded product 65 only under the force of the shears drive 41/42. If desired, the product may at the same time be cut between the pressure plates 25 and 26.

In FIGURE 6, as a further constructional possibility, the press rod 34 is equipped with a drive of its own. This consists of a piston 70, with a piston rod 71, which are guided in a cylinder 72. The shearing cylinder 41 is here provided with a screw cap 73 for guiding the piston rod 71. The shearing of the press disc 67 and the discard 66 from the extruded product 65 with the forked shear blade 40 is effected by the descent of the cylinder 41 in the same way as in the embodiments previously described, but the element 51, in which the pivotal bearing 35, 36 and the thrust bearing 38 of the press rod 34 are mounted, is here part of a cylinder 72, which is adjacent to but not fixed to the cylinder 41; and the descent of the press rod 34 for the purpose of shearing the product 65 between the plates 25 and 26 is here effected by admitting pressure water to the cylinder 72 below the piston 70.

In explanation of the structural form of the bridge die it may be stated that the bridge 60 is connected, above and below (FIGURE 4) with the main part of the die 27, and in the middle thereof carries a mandrel, in such a way that the extrusion material is fed on all sides to the mandrel and is extruded along the latter.

It is also possible for the shears, with their drive 41/42, to be entirely omitted, and for the drive 70/72 of the press rod alone to apply the shearing force, which primarily comes into question when operating with blade dies. Even with the running-in die, however, and even with the blade die, it is possible to work with the press rod without a shear blade.

The operatively non-releasable coupling illustrated in FIGURE 1 between the press rod 34 and the shearing cylinder 41 may alternatively be replaced by a coupling which is readily releasable in operation.

Also in the case of a holder arm which is divided transversely to its axis of rotation, and which carries in one of its parts only the dies 27 and in its other part the pressure plates 26, working with the press rod is possible. The press rod would in this case preferably engage in the part of the holder arm carrying the dies, in which case there is the possibility of making the pressure plate and the die sharp-edged on their adjacent surfaces, and shearing here. There are however still the essential advantages therein of rocking the holder arm with great force, and thus effecting a shearing without having to increase the force of the rotary drive of the holder arm.

We claim:

1. A horizontal metal-extrusion press, comprising: a retractable container, a holder arm capable of turning, about an axis parallel to the axis of the press, into and out of the extrusion position, a die-holder carried by the holder arm, a press rod, actuating means capable of bringing the press rod into a position directed towards the holder arm, an abutment on the holder arm, the press rod being adapted to engage that abutment and turn the holder arm through an angle when the actuating means for the press rod is in an operative position.

2. A horizontal metal-extrusion press as claimed in claim 1, wherein the press rod is rockably mounted on the press-rod actuating means.

3. A horizontal metal-extrusion press as claimed in claim 2, further comprising: a severing appliance mounted upon the press-rod actuating means, and means for bringing the severing appliance into action between the die and the container when the container is retracted.

4. A horizontal metal-extrusion press as claimed in claim 2, the press-rod actuating means comprising: a piston mounted fast on the press, and a hydraulic cylinder enclosing the piston and slidable relatively thereto, the press rod being rockably mounted on this cylinder.

5. A horizontal metal-extrusion press as claimed in claim 2, the press-rod actuating means comprising: a piston mounted fast on the press, a hydraulic cylinder enclosing the piston and slidable relatively thereto, a severing appliance carried by this cylinder, a piston rod externally mounted fast on this cylinder, a piston secured to this piston rod, and a hydraulic cylinder enclosing this latter piston and slidable relatively thereto, the press rod being rockably mounted on this latter cylinder.

References Cited in the file of this patent

UNITED STATES PATENTS

| 1,650,411 | Yates | Nov. 22, 1927 |
| 1,849,044 | Summey | Mar. 8, 1932 |
| 2,428,650 | Brunner | Oct. 7, 1947 |
| 2,728,453 | Thweatt et al. | Dec. 27, 1955 |
| 2,858,017 | Kent et al. | Oct. 28, 1958 |
| 2,896,782 | Billen | July 28, 1959 |
| 2,914,171 | Hoffmann et al. | Nov. 24, 1959 |

FOREIGN PATENTS

| 1,163,770 | France | Apr. 28, 1958 |

OTHER REFERENCES

"Mechanisms and Dynamics of Machinery," by Mabie and Ocvirk, John Wiley and Sons, Inc., New York, 1957 (pp. 283 and 294 relied upon).